US010234209B2

(12) United States Patent
Tokuda et al.

(10) Patent No.: US 10,234,209 B2
(45) Date of Patent: Mar. 19, 2019

(54) HEAT EXCHANGER

(71) Applicant: NGK Insulators, Ltd., Nagoya (JP)

(72) Inventors: Masahiro Tokuda, Nagoya (JP);
Tatsuo Kawaguchi, Nagoya (JP);
Makoto Miyazaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 166 days.

(21) Appl. No.: 14/856,640

(22) Filed: Sep. 17, 2015

(65) Prior Publication Data

US 2016/0003550 A1    Jan. 7, 2016

Related U.S. Application Data

(63) Continuation of application No. PCT/JP2014/057625, filed on Mar. 19, 2014.

(30) Foreign Application Priority Data

Mar. 22, 2013  (JP) ................................ 2013-061021

(51) Int. Cl.
  *F28D 7/00*    (2006.01)
  *F28F 21/04*    (2006.01)
  (Continued)

(52) U.S. Cl.
  CPC ......... *F28D 7/0066* (2013.01); *F01N 3/0205* (2013.01); *F01N 3/043* (2013.01);
  (Continued)

(58) Field of Classification Search
  CPC ........ F28D 7/006; F28D 7/0083; F28D 7/103; F28D 21/0003; F01N 3/0205;
  (Continued)

(56) References Cited

U.S. PATENT DOCUMENTS 2,066,480 A * 1/1937 McKerrall ................ F23K 5/20
  165/141
2,249,952 A * 7/1941 Gerstung ................. F01P 11/08
  165/141
(Continued)

FOREIGN PATENT DOCUMENTS

CN    102652249 A    8/2012
DE    3318722 A1 * 11/1984 ............. F28D 7/103
(Continued)

OTHER PUBLICATIONS

Extended European Search Report (Application No. 14769234.7) dated Dec. 22, 2016.
(Continued)

*Primary Examiner* — Tho V Duong
(74) *Attorney, Agent, or Firm* — Burr & Brown, PLLC

(57) ABSTRACT

To provide a heat exchanger that can control temperatures of fluids to be heat-exchanged. A heat exchanger 30 includes a honeycomb structure 1, a second fluid flow through portion 26 located at an outer periphery side of the honeycomb structure 1 serving as a flow passage for a second fluid, and a third fluid flow through portion 27 located at an outer periphery side of the second fluid flow through portion 26 serving as a flow passage for a third fluid. Cells 3 of the honeycomb structure 1 serve as a first fluid flow through portion 25 through which the first fluid passes. With the heat exchanger 30, the first fluid, the second fluid, and the third fluid can be heat-exchanged without being mixed with one another. Constituting the fluid flow passage with three flow passages allows controlling temperatures of two fluids to be heat-exchanged by the residual fluid.

5 Claims, 11 Drawing Sheets

(51) Int. Cl.
*F28F 7/02* (2006.01)
*F28D 7/10* (2006.01)
*F28D 21/00* (2006.01)
*F01N 3/04* (2006.01)
*F01N 3/10* (2006.01)
*F01N 3/28* (2006.01)
*F01N 3/02* (2006.01)
*F28F 1/06* (2006.01)
*F28F 1/08* (2006.01)

(52) U.S. Cl.
CPC ............ *F01N 3/10* (2013.01); *F01N 3/2882* (2013.01); *F28D 7/0083* (2013.01); *F28D 7/103* (2013.01); *F28D 21/0003* (2013.01); *F28F 7/02* (2013.01); *F28F 21/04* (2013.01); *F01N 2240/02* (2013.01); *F01N 2260/024* (2013.01); *F28D 2021/0089* (2013.01); *F28D 2021/0094* (2013.01); *F28F 1/06* (2013.01); *F28F 1/08* (2013.01); *Y02T 10/20* (2013.01)

(58) Field of Classification Search
CPC .......... F01N 3/043; F01N 3/10; F01N 3/2882; F28F 7/02; F28F 21/04
See application file for complete search history.

(56) References Cited

U.S. PATENT DOCUMENTS

| | | | |
|---|---|---|---|
| 3,357,413 A * | 12/1967 | Quinton | F01N 5/00 123/41.05 |
| 3,777,343 A | 12/1973 | D'Onofrio et al. | |
| 5,174,369 A * | 12/1992 | Glass | F28D 7/103 165/144 |
| 6,176,082 B1 * | 1/2001 | Shaffer | F01N 3/02 60/321 |
| 6,220,344 B1 * | 4/2001 | Beykirch | F28D 7/022 165/154 |
| 2005/0150640 A1 * | 7/2005 | Nadig | F28F 1/36 165/141 |
| 2012/0247732 A1 * | 10/2012 | Suzuki | F28F 7/02 165/104.14 |

FOREIGN PATENT DOCUMENTS

| | | |
|---|---|---|
| JP | 49-021250 U1 | 2/1974 |
| JP | 58-6232 A1 | 1/1983 |
| JP | 62009183 A * | 1/1987 |
| JP | 2011-191034 A1 | 9/2011 |
| JP | 2013011428 A * | 1/2013 |
| WO | 2011/071161 A1 | 6/2011 |

OTHER PUBLICATIONS

Chinese Office Action (Application No. 201480017255.7) dated Nov. 2, 2016.
English Translation of the Written Opinion (PCT/ISA/237) (Application No. PCT/JP2014/057625) of ISA.
International Search Report and Written Opinion (Application No. PCT/JP2014/057625) dated Jul. 1, 2014.
Japanese Office Action (with English translation), Japanese Application No. 2015-506840, dated Mar. 13, 2018 (8 pages).

* cited by examiner

HEAT EXCHANGER

BACKGROUND OF THE INVENTION

1. Field of the Invention

The present invention relates to a heat exchanger for heat exchange between a plurality of fluids.

2. Description of Related Art

While improvement in fuel consumption of automobiles has been demanded, to prevent the fuel consumption from worsening when an engine is cold, such as engine start, a system that promptly warms cooling water, an engine oil, an automatic transmission fluid (ATF), and the like to reduce a friction loss has been expected. Additionally, to prevent an excessive temperature rise of the cooling water, the engine oil, the automatic transmission fluid (ATF), and the like when the temperature of the engine has been raised after engine warm-up and the like exceeding the limit of cooling performance of a radiator, a technique that can control temperatures has been expected.

For example, there has been provided a technique that exchanges heat using a honeycomb structure made of a ceramic material (see Patent Document 1). In this case, a first fluid is allowed to flow through the inside of the honeycomb structure and a second fluid is allowed to flow through the outside, thus performing the heat exchange. The heat exchange from a high-temperature fluid to a low-temperature fluid allows effective use of the heat.

CITATION LIST

Patent Documents

[Patent Document 1] WO 2011/071161

SUMMARY OF THE INVENTION

Problem to be Solved by the Invention

The heat exchange of two fluids, the first fluid and the second fluid, transmits heat from the higher temperature fluid to the lower temperature fluid; therefore, the temperature of one fluid dominates the temperature of the other fluid, and this sometimes made it difficult to set desired temperatures.

The problem of the present invention is to provide a heat exchanger that can control the temperature of the fluids to be heat-exchanged.

Means for Solving the Problem

A solution for the problem has been found by designing a heat exchanger to have a structure where three fluids, a first fluid, a second fluid, and a third fluid are allowed to flow through. According to the present invention, the following heat exchanger is provided.

According to a first aspect of the present invention, a heat exchanger includes a honeycomb structure of which main component is ceramics having a tubular circumferential wall and a partition wall defining and forming a plurality of cells serving as a flow passage for a first fluid; a second fluid flow through portion located at an outer periphery side of the honeycomb structure and serving as a flow passage for a second fluid; and a third fluid flow through portion located at an outer periphery side of the second fluid flow through portion and serving as a flow passage for a third fluid, and heat is exchanged among the first fluid, the second fluid, and the third fluid without being mixed with one another.

According to a second aspect of the present invention, the heat exchanger according to the first aspect further includes a covering member located on an outer periphery side of the honeycomb structure to cover the honeycomb structure, and the second fluid flow through portion is provided on an outer periphery side of the covering member.

According to a third aspect of the present invention, the heat exchanger according to the first or second aspects, a concave portion or a convex portion is provided on at least any of the wall surfaces of the second fluid flow through portion and the third fluid flow through portion to increase a surface area of the wall surface.

According to a fourth aspect of the present invention, the heat exchanger according to any one of the first to third aspects is provided, a part of at least one of the outer circumferential wall of the inner casing constituting the second fluid flow through portion and the outer circumferential wall of the outer casing constituting the third fluid flow through portion is in contact with an opposed surface on an inner peripheral side to form a contact portion.

According to a fifth aspect of the present invention, the heat exchanger according to the fourth aspect is provided, the contact portion is formed at least at either of the second fluid flow through portion and the third fluid flow through portion, while a non-contact portion with the opposed surface on the inner peripheral side is also present at the outer circumferential wall forming the contact portion in any cross section perpendicular to an axial direction of the honeycomb structure in a range of the axial direction where the contact portion is formed, so that the presence of the non-contact portion allows the second fluid to flow through the second fluid flow through portion without interference and further allows the third fluid to flow through the third fluid flow through portion without interference.

According to a sixth aspect of the present invention, the heat exchanger according to the first to fifth aspects further includes flow rate control means configured to control the flow rate of the fluid at least at a flow passage for any of the fluids of the first fluid, the second fluid, and the third fluid.

Effect of the Invention

Since a heat exchanger includes the flow passage for third fluid in addition to the flow passage for first fluid and the flow passage for second fluid for heat exchange, the third fluid can control the temperatures of the first fluid and the second fluid, thus preventing excessive temperature rise.

DETAILED DESCRIPTION OF THE INVENTION

The following describes embodiments of the present invention with reference to the drawings. The present invention is not limited to the following embodiments, and changes, modifications, and improvements can be added to the embodiments without departing from the scope of the invention.

Embodiment 1

Figure 1A:
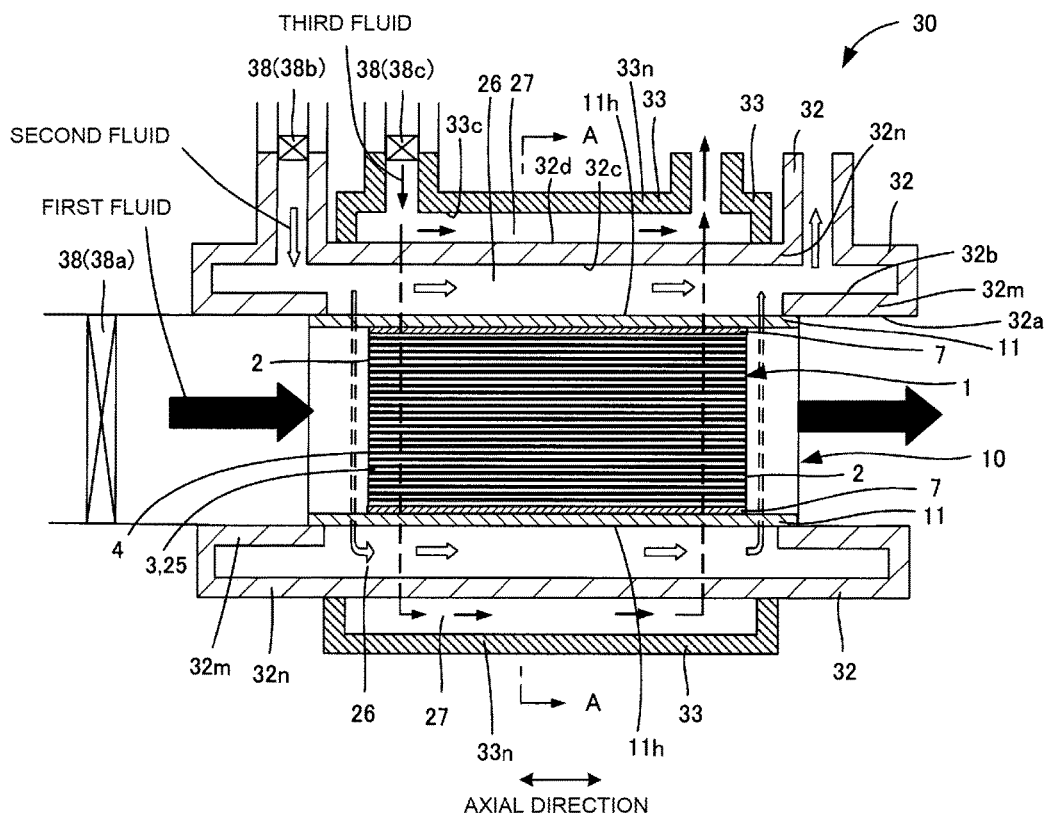
FIG. 1A shows a cross-sectional view of a heat exchanger of Embodiment 1 of the present invention parallel to an axis direction.
Figure 1B:
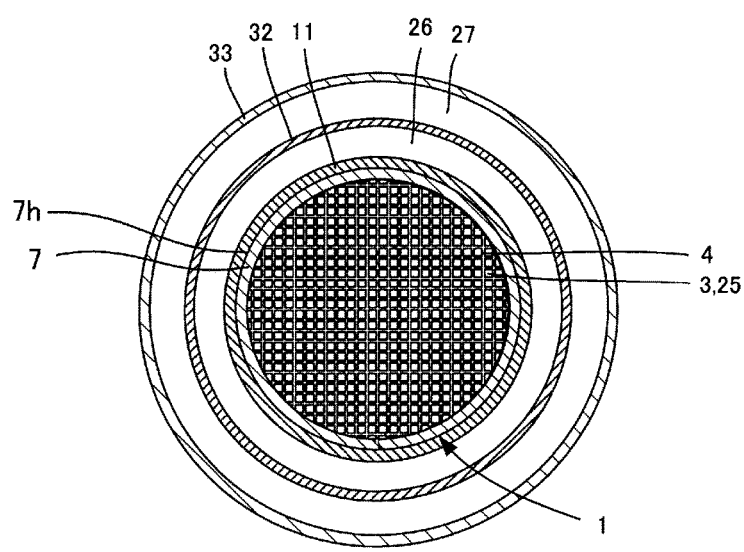
FIG. 1B is an A-A cross-sectional view of FIG. 1A.

FIG. 1A shows a cross-sectional view of a cross section of a heat exchanger 30 of Embodiment 1 of the present invention parallel to an axis direction. FIG. 1B is an A-A cross-sectional view of FIG. 1A. The heat exchanger 30 of the present invention includes a honeycomb structure 1, a second fluid flow through portion 26, which serves as a flow passage for second fluid, provided at an outer periphery side of the honeycomb structure 1, and a third fluid flow through portion 27, which serves as a flow passage for third fluid, provided at an outer periphery side of the second fluid flow through portion 26. The main component of the honeycomb structure 1 is ceramics and has a tubular circumferential wall 7 and partition walls 4, which define and form a plurality of cells 3 serving as the flow passage for first fluid. The cell 3 of the honeycomb structure 1 serves as a first fluid flow through portion 25 through which the first fluid passes. The heat exchanger 30 can perform heat exchange without mixing the first fluid, the second fluid, and the third fluid with one another.

As shown in FIG. 1A and FIG. 1B, a covering member 11, which covers the honeycomb structure 1, can also be provided on the outer periphery side of the honeycomb structure 1. In this embodiment, the second fluid flow through portion 26 is provided at the outer periphery side on the covering member 11. Using FIG. 2A and FIG. 2B, the embodiment including the covering member 11 will be described.

Figure 2A:
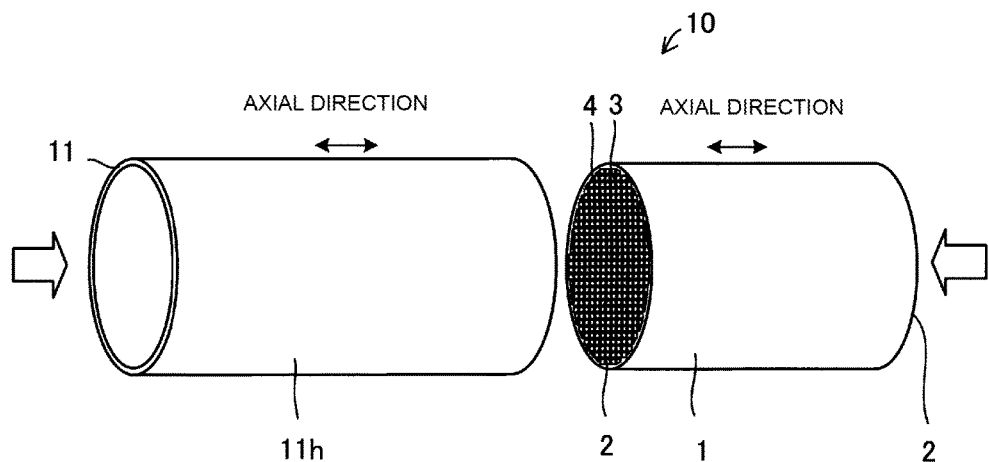
FIG. 2A is a schematic diagram showing a honeycomb structure and a covering member to be integrated.
Figure 2B:
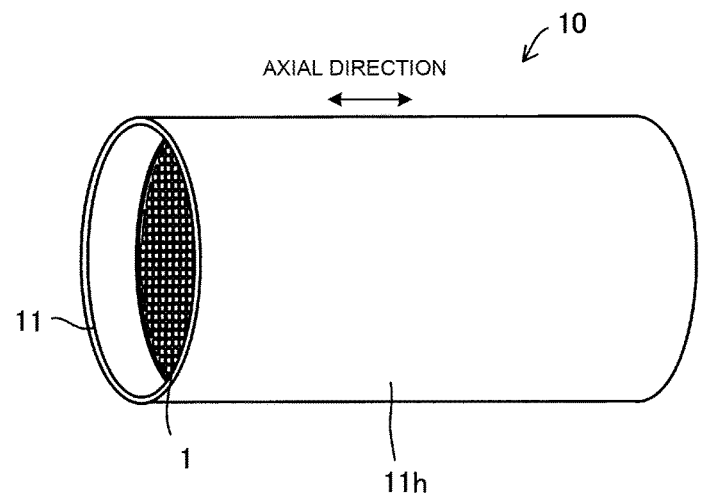
FIG. 2B is a schematic diagram showing a heat exchange member wherein the honeycomb structure and the covering member are integrated.

With the embodiment including the covering member 11, a heat exchange member 10 is formed of the honeycomb structure 1 whose main component is ceramics and the covering member 11 (for example, a metal tube), which covers the honeycomb structure 1, provided on the outer periphery side of the honeycomb structure 1. In this description, the honeycomb structure 1 and the covering member 11 are collectively referred to as heat exchange member 10. As shown in FIG. 2A, the honeycomb structure 1 is inserted into the covering member 11 and is integrated by shrink fitting, thus forming the heat exchange member 10 as shown in FIG. 2B. For bonding between the honeycomb structure 1 and the covering member 11, a press fit, brazing, diffusion bonding, and the like may be employed in addition to the shrink fitting.

It is preferable that the covering member 11, which covers the honeycomb structure 1, does not allow the first fluid and the second fluid to flow through, features good thermal conductivity, and has heat resistance and corrosion resistance. As the covering member 11, a metal tube, a ceramics tube, and the like may be listed. As the material for the metal tube, for example, stainless steel, a titanium alloy, a copper alloy, an aluminum alloy, brass, and the like can be used.

Since the covering member 11 covers an outer circumferential surface 7h of the honeycomb structure 1, the first fluid flowing inside the honeycomb structure 1 and the second fluid flowing outside the honeycomb structure 1 are each allowed to flow through without being mixed, ensuring the heat exchange. Since the heat exchange member 10 includes the covering member 11, it facilitates processing the heat exchange member 10 depending on the installation site and the installation method, providing high degree of freedom. The heat exchange member 10 can protect the honeycomb structure 1 by the covering member 11 and therefore has resistance to an impact from the outside.

This heat exchange member 10 is housed in an inner casing 32 constituting the second fluid flow through portion 26 (see FIG. 1A). Further, an outer casing 33, which constitutes the third fluid flow through portion 27, is provided at the outer periphery side of the inner casing 32. The materials of the inner casing 32, which constitutes the second fluid flow through portion 26, and the outer casing 33, which constitutes the third fluid flow through portion 27, preferably do not allow the second fluid and the third fluid to flow through, feature good thermal conductivity, and have heat resistance and corrosion resistance. As the materials constituting the inner casing 32 and the outer casing 33, metal, ceramics, and the like may be listed. As the metal, for example, stainless steel, a titanium alloy, a copper alloy, an aluminum alloy, brass, and the like can be used.

In the heat exchanger 30 of Embodiment 1, it is constituted so that the wall on the inner peripheral side of the inner casing 32 (inner circumferential wall 32m) partially lacks and a part of the outer circumferential surface 11h of the covering member 11 of the heat exchange member 10 is directly in contact with the second fluid. An inner circumferential surface 32a of the inner circumferential wall 32m of the inner casing 32 fits the outer circumferential surface 11h of the covering member 11, and the inner casing 32 extends axially outward from the end of the covering member 11 in the axial direction. The outer circumferential surface 11h of the covering member 11, the outer circumferential surface 32b of the inner circumferential wall 32m of the inner casing 32, and the inner circumferential surface 32c of the outer circumferential wall 32n form the second fluid flow through portion 26, which is the flow passage for second fluid. Such constitution enables heat exchange between the second fluid and the first fluid.

With the heat exchanger 30 of Embodiment 1, the outer casing 33 also lacks the wall on the inner peripheral side, and a part of an outer circumferential surface 32d of the outer circumferential wall 32n of the inner casing 32 is constituted so as to be directly in contact with the third fluid. That is, the outer circumferential surface 32d of the outer circumferential wall 32n of the inner casing 32 and the inner circumferential surface 33c of the outer circumferential wall 33n of the outer casing 33 form the third fluid flow through portion 27, which is the flow passage for third fluid. Such constitution enables heat exchange between the third fluid and the second fluid.

It is preferable that at least on any of the wall surfaces of the second fluid flow through portion 26 and the third fluid flow through portion 27, a concave portion or a convex portion 34, which increases the surface area of the wall surface, is provided. Specifically, the outer circumferential surface 11h of the covering member 11, the outer circumferential surface 32b of the inner circumferential wall 32m of the inner casing 32, the inner circumferential surface 32c of the outer circumferential wall 32n, the outer circumferential surface 32d, and the inner circumferential surface 33c of the outer circumferential wall 33n of the outer casing 33 may be listed.

Figure 3A:
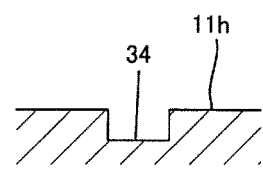
FIG. 3A is a schematic diagram showing a concave portion or a convex portion of Embodiment 1.
Figure 3B:
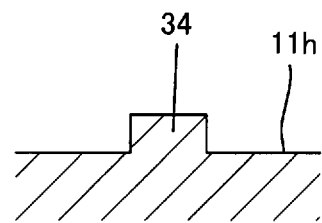
FIG. 3B is a schematic diagram showing the concave portion or the convex portion of Embodiment 2.
Figure 3C:
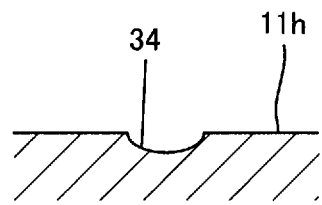
FIG. 3C is a schematic diagram showing the concave portion or the convex portion of Embodiment 3.

FIG. 3A to FIG. 3C show embodiments of the concave portion or the convex portion 34. The concave portion or the convex portion 34 can be formed by groove machining, concaved portion machining, and the like. FIG. 3A is an embodiment wherein a groove portion is formed by performing the groove machining. FIG. 3B is an embodiment wherein the portion is formed as a convex portion. FIG. 3C is an embodiment where a concaved portion machining is performed. As long as the surface area of the flow passage for fluid increases, the shape and the formation method of the concave portion or the convex portion 34 are not limited. The formation of such concave portion or convex portion 34 allows increasing the contacted area of the fluid with the flow passage and improving heat exchange efficiency. Reference numeral 11h in FIG. 3A to FIG. 3C may also be 32b, 32c, 32d, and 33c.

The honeycomb structure 1 is made of ceramics, formed into a tubular shape, and has flow passages for fluid penetrating from one end face 2 to the other end face 2 in the axial direction. The honeycomb structure 1 has the partition walls 4 that define and form a large count of the cells 3, which serve as the flow passages for fluid. By providing the partition walls 4, heat from the fluid allowed to flow through the inside of the honeycomb structure 1 can be efficiently collected, ensuring transmission of the heat to the outside.

The outer shape of the honeycomb structure 1 is not limited to a cylindrical shape (round pillar-shape), and the cross section of the honeycomb structure 1 perpendicular to the axial (longitudinal) direction may have an oval shape. The outer shape of the honeycomb structure 1 may have a prismatic columnar shape, that is, the cross section perpendicular to the axial (longitudinal) direction may have a quadrangular shape or other polygonal shapes.

With the heat exchanger 30, the use of ceramics as the main component of the honeycomb structure 1 can enhance coefficient of thermal conductivity of the partition wall 4 and the circumferential wall 7, and as a result, the heat exchange mediating the partition walls 4 and the circumferential wall 7 can be efficiently performed. In this description, "ceramics as the main component" means that the ceramics is contained by 50 mass % or more.

The porosity of the honeycomb structure 1 is preferably 10% or less, more preferably 5% or less, and further preferably 3% or less. Designing the porosity to 10% or less allows improving the coefficient of thermal conductivity.

Especially considering the heat conductivity, the main component of the honeycomb structure 1 is preferably silicon carbide (SiC) which has a high thermal conductivity. The main component means that 50 mass % or more of the honeycomb structure 1 is silicon carbide.

Further specifically, as the material of the honeycomb structure 1, Si-impregnated SiC, (Si+Al)-impregnated SiC, metal-composite SiC, recrystallized SiC, $Si_3N_4$, SiC, and the like can be employed. However, in the case of a porous body, high coefficient of thermal conductivity cannot be obtained in some cases; therefore, to obtain a high heat exchange efficiency, designing a dense body structure (porosity of 5% or less) is preferable and employing the Si-impregnated SiC or (Si+Al)-impregnated SiC is preferable. The SiC has a feature of high coefficient of thermal conductivity and being likely to release heat; however, SiC with impregnated Si is densely formed and exhibits sufficient strength as a heat transfer member while exhibiting high coefficient of thermal conductivity and heat resistance. For example, in the case of porous body made of silicon carbide (SiC), the coefficient of thermal conductivity is approximately 20 W/(m·K); however, designing the SiC to a dense body allows the coefficient of thermal conductivity of approximately 150 W/(m·K).

As the cell shape of the cross section of the cell 3 of the honeycomb structure 1 perpendicular to the axial direction, a desired shape among a circular shape, an oval shape, a triangular shape, a quadrangular shape, a hexagonal shape, other polygonal shapes, and the like may be appropriately selected.

The cell density of the honeycomb structure 1 (that is, the count of cells per unit cross-sectional area) is not especially limited; therefore, the cell density may be appropriately designed according to the purpose, but meanwhile, the cell density is preferably within the range of 25 to 2000 cells/square inch (4 to 320 cells/cm$^2$). Designing the cell density to 25 cells/square inch or more allows making the strength of the partition wall 4, and eventually the strength and effective GSA (geometric surface area) of the honeycomb structure 1 itself sufficient. Designing the cell density to 2000 cells/square inch or less allows preventing the increase in pressure loss when a heating medium is allowed to flow.

The isostatic strength of the honeycomb structure 1 is preferably 1 MPa or more and more preferably 5 MPa or more. Having such strength ensures sufficient durability.

The diameter of the honeycomb structure 1 is preferably 200 mm or less and further preferably 100 mm or less. Such diameter allows improving the heat exchange efficiency.

The thickness (wall thickness) of the partition wall 4 of the cell 3 of the honeycomb structure 1 may also be appropriately designed according to the purpose and is not especially limited. The wall thickness is preferably designed to be 0.1 to 1 mm and further preferably designed to be 0.2 to 0.6 mm. Designing the wall thickness to 0.1 mm or more makes the mechanical strength sufficient and can prevent damage by impact and thermal stress. Designing the wall thickness to 1 mm or less allows preventing a malfunction such as an increase in the pressure loss for the fluid and a reduction of the heat exchange efficiency transmitted by the heating medium.

The density of the partition wall 4 of the cells 3 of the honeycomb structure 1 is preferable to be 0.5 to 5 g/cm$^3$. Designing the density to 0.5 g/cm$^3$ or more brings sufficient strength to the partition wall 4, ensuring preventing the partition wall 4 from being damaged by pressure when the first fluid is allowed to flow through the inside of the flow passage. Designing the density to 5 g/cm$^3$ or less allows reducing the weight of the honeycomb structure 1. Designing the density within the above-described range ensures the strong honeycomb structure 1, also allowing obtaining an effect of improving the coefficient of thermal conductivity.

The coefficient of thermal conductivity of the honeycomb structure 1 is preferable to be 50 W/(m·K) or more. The coefficient of thermal conductivity is more preferably 100 W/(m·K) to 300 W/(m·K) and further preferably at 120 W/(m·K) to 300 W/(m·K). Designing the coefficient of thermal conductivity within this range brings good thermal conductivity, ensuring efficiently discharging the heat inside the honeycomb structure 1 to the outside of the covering member 11.

When allowing to flow exhaust gas as the first fluid, the heat exchanger 30 is preferably loaded with a catalyst on the partition wall 4 of the honeycomb structure 1. By thus causing the partition wall 4 to be loaded with the catalyst, CO, NOx, HC, and the like in the exhaust gas can be a harmless substance by catalytic reaction, and further heat of reaction generated during the catalytic reaction can be used for heat exchange. The catalyst used for the honeycomb structure 1 of the present invention may contain at least one kind of elements selected from the group consisting of noble metal (platinum, rhodium, palladium, ruthenium, indium, silver, and gold), aluminum, nickel, zirconium, titanium, cerium, cobalt, manganese, zinc, copper, tin, iron, niobium, magnesium, lanthanum, samarium, bismuth, and barium. The catalysts listed here may be metal, its oxide, or other compound.

As an amount of loading of the catalyst (catalytic metal+carrier body) loaded to the partition walls 4 of the cells 3 of the first fluid flow through portion 25 of the honeycomb structure 1 where the first fluid (high temperature side) is allowed to flow through, 10 to 400 g/L is preferable and in the case of noble metal, 0.1 to 5 g/L is further preferable. When designing the amount of loading of the catalyst (catalytic metal+carrier body) to 10 g/L or more, a catalytic action is likely to appear. On the other hand, designing the amount of loading to 400 g/L or less reduces the pressure loss, ensuring reducing an increase in production cost.

Not only the heat exchanger 30 can perform heat exchange between the first fluid and the second fluid but also has a function to control the temperature of the second fluid since the flow passage for third fluid on the outer periphery side of the second fluid is provided. For example, in case the first fluid has a temperature higher than the second fluid and the third fluid has a temperature lower than the second fluid before the heat exchange, the heat exchange between the second fluid and the first fluid increases the temperature of the second fluid; however, the heat exchange with the third fluid allows reducing the temperature of the second fluid.

It is preferable that the heat exchanger 30 includes flow rate control means 38, which controls the flow rate of the fluid, at the flow passages for at least one fluid of the first fluid, the second fluid, and the third fluid. In FIG. 1A, the flow passage for the first fluid is provided with the flow rate control means 38a, which controls the flow rate of the first fluid, the flow passage for the second fluid is provided with the flow rate control means 38b, which controls the flow rate of the second fluid, and the flow passage for the third fluid is provided with the flow rate control means 38c, which controls the flow rate of the third fluid. As the flow rate control means 38, specifically, a control valve and the like may be listed. By providing such flow rate control means 38, the temperatures of the respective fluids are easily controlled.

With the heat exchanger 30, by turning ON/OFF the flow-in of the respective fluids, the heat exchange only between the flow passages to be heat-exchanged is possible. For example, in case the first fluid is gas, the second fluid is liquid, and the third fluid is liquid, when turning OFF only the third fluid (not allowed to flow in), the heat exchange only between the gas (first fluid) and the liquid (second fluid) is possible. When turning OFF only the first fluid (not allowed to flow in), the heat exchange only between the liquid (second fluid) and the liquid (third fluid) is possible. Alternatively, when flowing in the all fluids, the heat exchange between the gas (first fluid), the liquid (second fluid), and the liquid (third fluid) is possible.

(Method for Manufacturing Heat Exchanger)

The following describes a method for manufacturing the heat exchanger 30. First, kneaded material containing ceramics powder is extruded to a desired shape, thus fabricating a honeycomb formed body. As the material of the honeycomb structure 1, the above-described ceramics can be used; however, for example, to manufacture the honeycomb structure 1 whose main component is Si-impregnated SiC composite material, a predetermined amount of SiC powder, a binder, water, or an organic liquid medium is mixed to form the kneaded material, and the kneaded material is formed to obtain a honeycomb formed body with the desired shape. The honeycomb formed body is dried, and metal Si is immersed and sintered in the honeycomb formed body under depressurized inert gas or vacuum, thus allowing obtaining the honeycomb structure 1 where the partition walls 4 define and form the plurality of cells 3, which serve as the flow passages for gas.

Subsequently, the temperature of the covering member 11 is increased, and as shown in FIG. 2A and FIG. 2B, the honeycomb structure 1 is inserted into the covering member 11 and is integrated by shrink fitting, thus ensuring forming the heat exchange member 10. For bonding between the honeycomb structure 1 and the covering member 11, in addition to the shrink fitting, press fitting, brazing, diffusion bonding, and the like may be employed.

Afterwards, the heat exchange member 10 is disposed in the inner casing 32 made of stainless steel. Afterwards, the outer casing 33 covers the outside of the inner casing 32, thus forming the heat exchanger 30 constituted of three flow passages.

Embodiment 2

Figure 4:
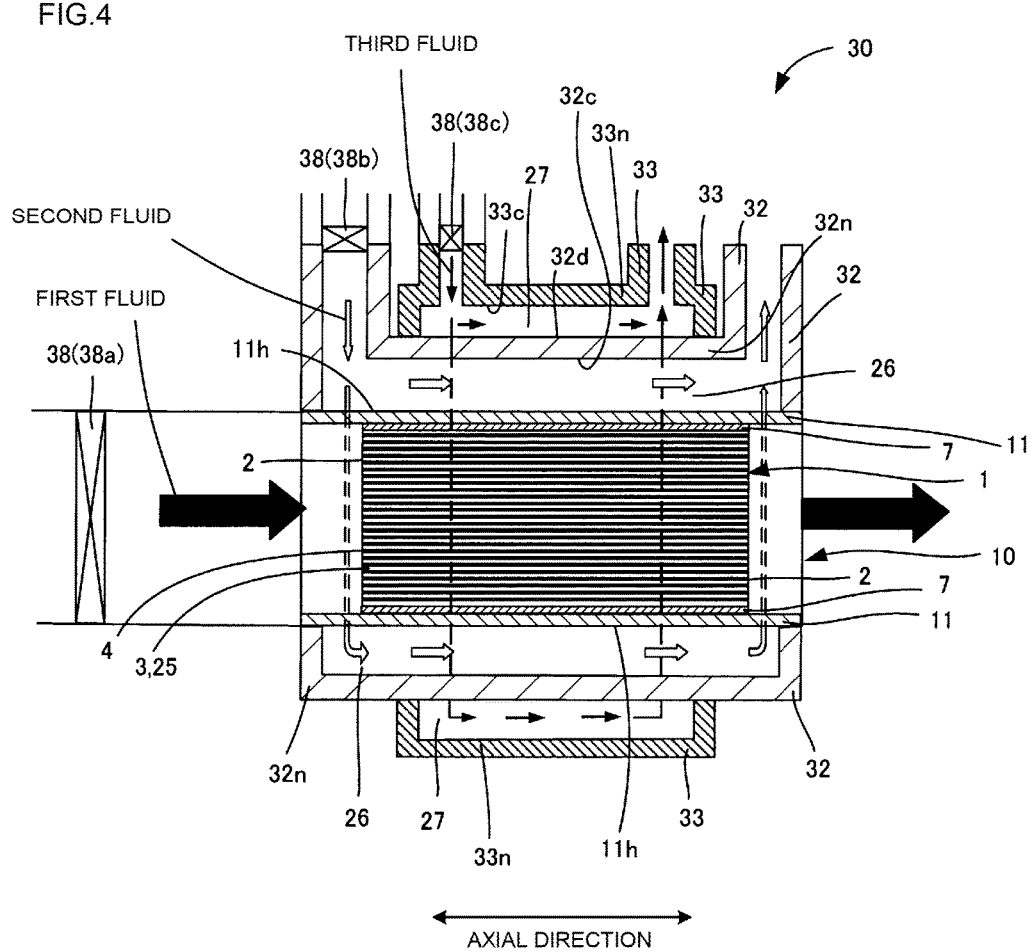
FIG. 4 shows a cross-sectional view of a cross section of a heat exchanger of Embodiment 2 of the present invention parallel to the axis direction.

FIG. 4 is a cross-sectional view showing the heat exchanger 30 of Embodiment 2. In Embodiment 2, the inner casing 32 is provided up to the end of the covering member 11 in the axis direction and does not extend axially outward from the end. However, the inner casing 32 is provided up to outward in the axial direction more than the end face 2 of the honeycomb structure 1. In Embodiment 2, since the shape of the inner casing 32 is simplified, the production cost can be reduced, and further the inner casing 32 is provided up to outward in the axial direction more than the end face 2 of the honeycomb structure 1, and therefore heat exchange performance can be sufficiently provided.

Embodiment 3

Figure 5:
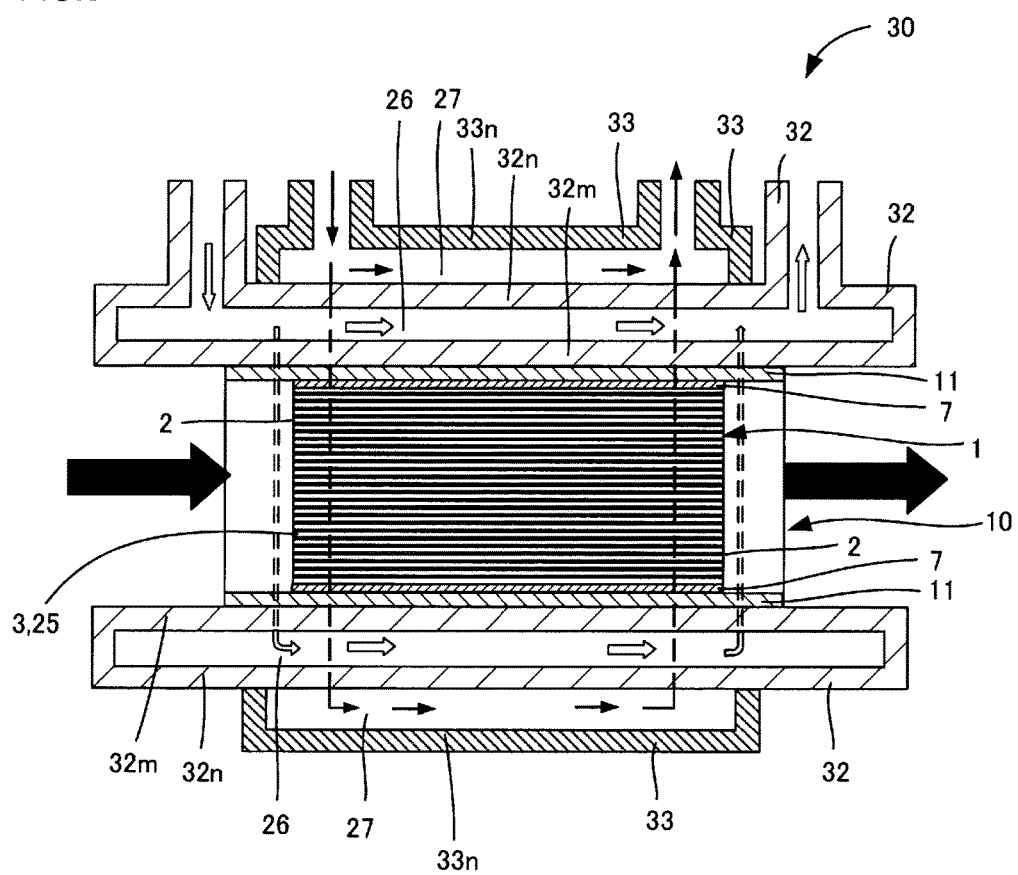
FIG. 5 shows a cross-sectional view of a cross section of a heat exchanger of Embodiment 3 of the present invention parallel to the axis direction.

FIG. 5 is a cross-sectional view showing the heat exchanger 30 of Embodiment 3. In Embodiment 3, the wall on the inner peripheral side of the inner casing 32 (inner circumferential wall 32*m*) has no lack, and the wall on the inner peripheral side of the inner casing 32 covers the outer circumferential surface 11*h* of the covering member 11 of the heat exchange member 10. Thus, the second fluid is constituted so as not to be directly in contact with the covering member 11. The inner casing 32 is preferably provided so as to be closely in contact with the heat exchange member 10 to improve the heat exchange efficiency between the first fluid and the second fluid.

Similarly to Embodiment 1, a part of the wall on the inner peripheral side of the outer casing 33 lacks. However, like the inner casing 32, the outer casing 33 can also be constituted such that the wall on the inner peripheral side has no lack and the third fluid is not directly in contact with the inner casing 32. The outer casing 33 is preferably provided so as to be closely in contact with the inner casing 32 to improve the heat exchange efficiency between the second fluid and the third fluid.

Embodiment 4

Figure 6:
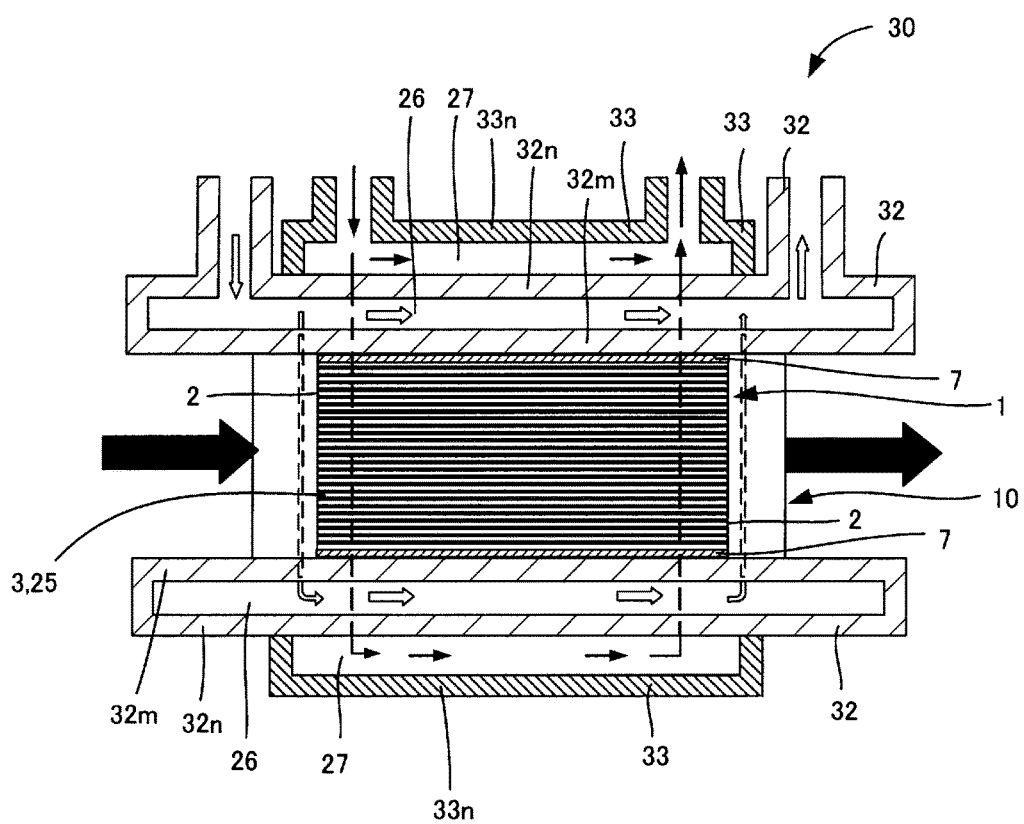
FIG. 6 shows a cross-sectional view of a cross section of a heat exchanger of Embodiment 4 of the present invention parallel to the axis direction.

FIG. 6 is a cross-sectional view showing the heat exchanger 30 of Embodiment 4. In Embodiment 4, the inner casing 32 and the outer casing 33 are identical to those of Embodiment 3. The honeycomb structure 1 does not include the covering member 11. This constitution allows omitting the process of integrating the honeycomb structure 1 and the covering member 11.

Embodiment 5

It is also a preferable form that the outer circumferential wall 32*n* of the inner casing 32, which constitutes the second fluid flow through portion 26, or the outer circumferential wall 33*n* of the outer casing 33, which constitutes the third fluid flow through portion 27, is partially in contact with an opposed surface at the inner peripheral side to form a contact portion 40. It is preferable that the contact portion 40 is formed at at least either of the second fluid flow through portion 26 and the third fluid flow through portion 27 while a non-contact portion 41 with the opposed surface on the inner peripheral side is present at the outer circumferential wall (outer circumferential wall 32*n* or outer circumferential wall 33*n*) forming the contact portion 40 in any cross section perpendicular to the axial direction in the range where the contact portion 40 is formed in the axial direction of the honeycomb structure 1. That is, it is preferable that the presence of the non-contact portion 41 allows the second fluid to flow through the second fluid flow through portion 26 without interference and further allows the third fluid to flow through the third fluid flow through portion 27 without interference.

The contact of a part of the outer circumferential wall (outer circumferential wall 32*n* or outer circumferential wall 33*n*) with the opposed surface on the inner peripheral side improves the structural strength of the casing; therefore, even if a foreign material of a stepping-stone and the like collides with the casing or thermal stress is applied due to a temperature difference inside the member, a deformation of the inner casing 32 or the outer casing 33 can be prevented. The contact of a part of the outer circumferential wall with the opposed surface on the inner peripheral side disturbs the flow of fluid and is likely to cause turbulence, and thus promoting the heat transmission and improving the heat exchange efficiency.

Figure 7A:
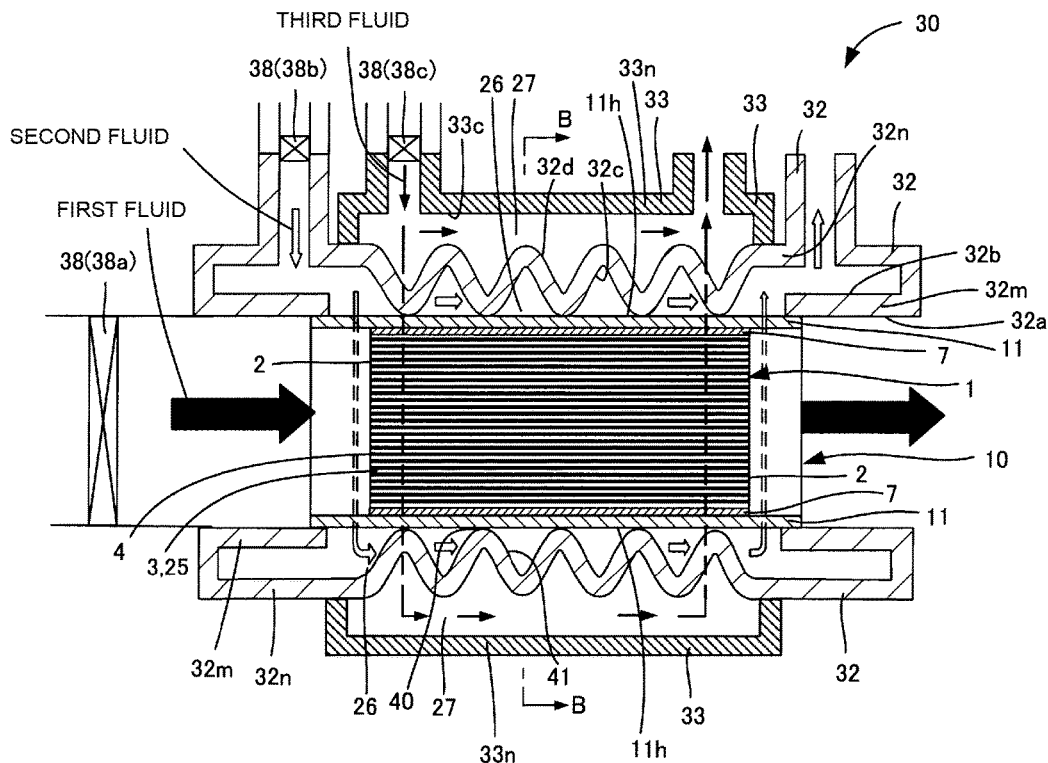
FIG. 7A shows a cross-sectional view of a cross section of a heat exchanger of Embodiment 5 of the present invention parallel to the axis direction.
Figure 7B:
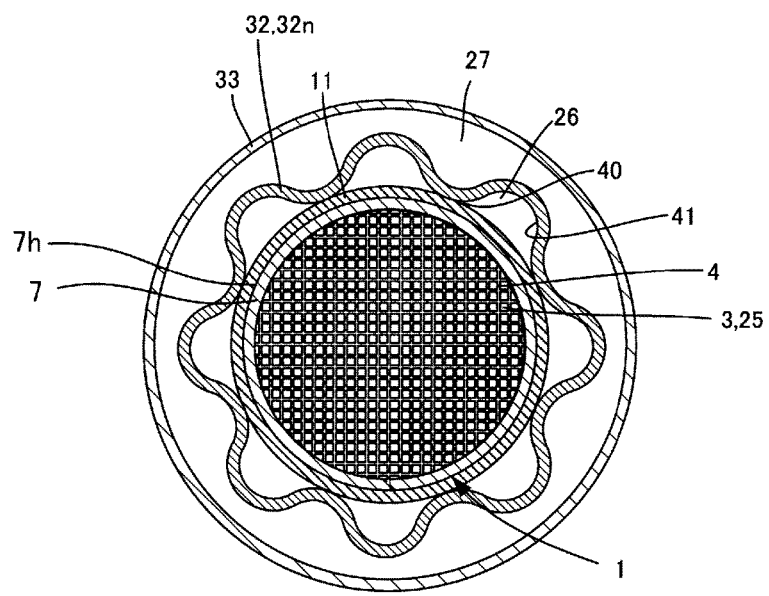
FIG. 7B shows a cross-sectional view of a cross section of a heat exchanger of Embodiment 5 of the present invention perpendicular to the axis direction.

FIG. 7A shows a cross-sectional view of a cross section of the honeycomb structure 1 parallel to the axis direction, and shows an embodiment where a part of the outer circumferential wall 32*n* of the inner casing 32 is in contact with the outer circumferential surface 11*h* of the covering member 11, which is an opposed surface on the inner peripheral side. FIG. 7B is a B-B cross-sectional view of FIG. 7A, and is a cross-sectional view of a cross section perpendicular to the axis direction.

As shown in FIG. 7A, the cross section of the outer circumferential wall 32*n* of the inner casing 32 in the axial direction is formed into a waveform and is in contact with the outer circumferential surface 11*h* of the covering member 11. As shown in FIG. 7B, the outer circumferential wall 32*n* is formed into a waveform also at the cross section of the honeycomb structure 1 perpendicular to the axial direction, and this provides the non-contact portion 41, which is not in contact with the outer circumferential surface 11*h*, which is an opposed surface at the inner peripheral side, of the covering member 11 at the outer circumferential wall 32*n* of the inner casing 32 forming the contact portion 40. This allows the second fluid to flow through the second fluid flow through portion 26 without interference. Since a part of the outer circumferential wall 32*n* of the inner casing 32 is in contact with the outer circumferential surface 11*h* of the covering member 11 at the inner peripheral side, even if the second fluid is not allowed to flow through or by any cause, the second fluid is stopped to flow through, a high temperature at the covering member 11, which covers the honeycomb structure 1, can be prevented (in the case where the first fluid has a high temperature). That is, this allows preventing the restraint by the covering member 11 from coming loose, resulting in a drop of the honeycomb structure 1. The shape of the outer circumferential wall 32*n* of the inner casing 32 is not limited to the shown shape.

Embodiment 6

Figure 8:
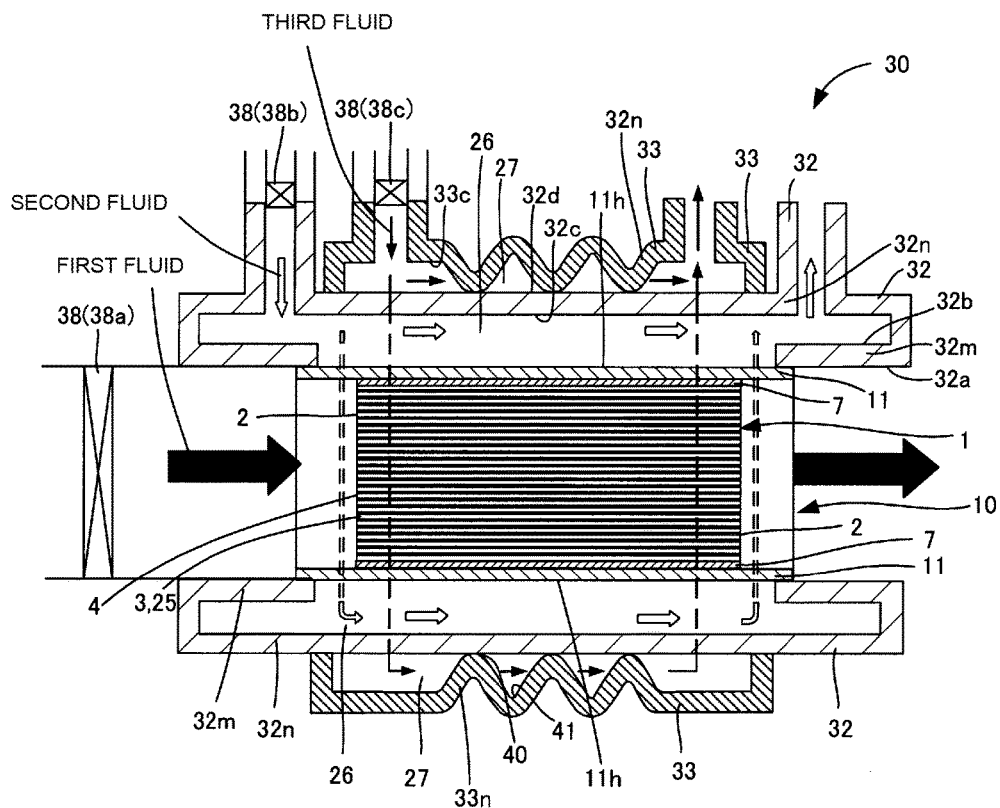
FIG. 8 shows a cross-sectional view of a cross section of a heat exchanger of Embodiment 6 of the present invention parallel to the axis direction.

FIG. 8 is a cross-sectional view of a cross section of the honeycomb structure 1 parallel to the axis direction, and shows an embodiment where the outer circumferential wall 33*n* of the outer casing 33 is partially in contact with the outer circumferential surface 32*d*, which is an opposed surface on the inner peripheral side, of the outer circumferential wall 32*n* of the inner casing 32. It is to be noted that, similarly to Embodiment 5, since a part of the outer circumferential wall 33*n* has the non-contact portion 41 which is not in contact with the outer circumferential surface 32*d* of the outer circumferential wall 32*n* of the inner casing 32, the third fluid flow through portion 27 is constituted such that the third fluid flows through the third fluid flow through portion 27 without interfere. Embodiment 6 also improves the structural strength of the outer casing 33; therefore, the deformation of the outer casing 33 can be prevented. Since the flow of the fluid is likely to cause turbulence, and this promotes the heat transmission and improves the heat exchange efficiency.

Embodiment 7

Figure 9:
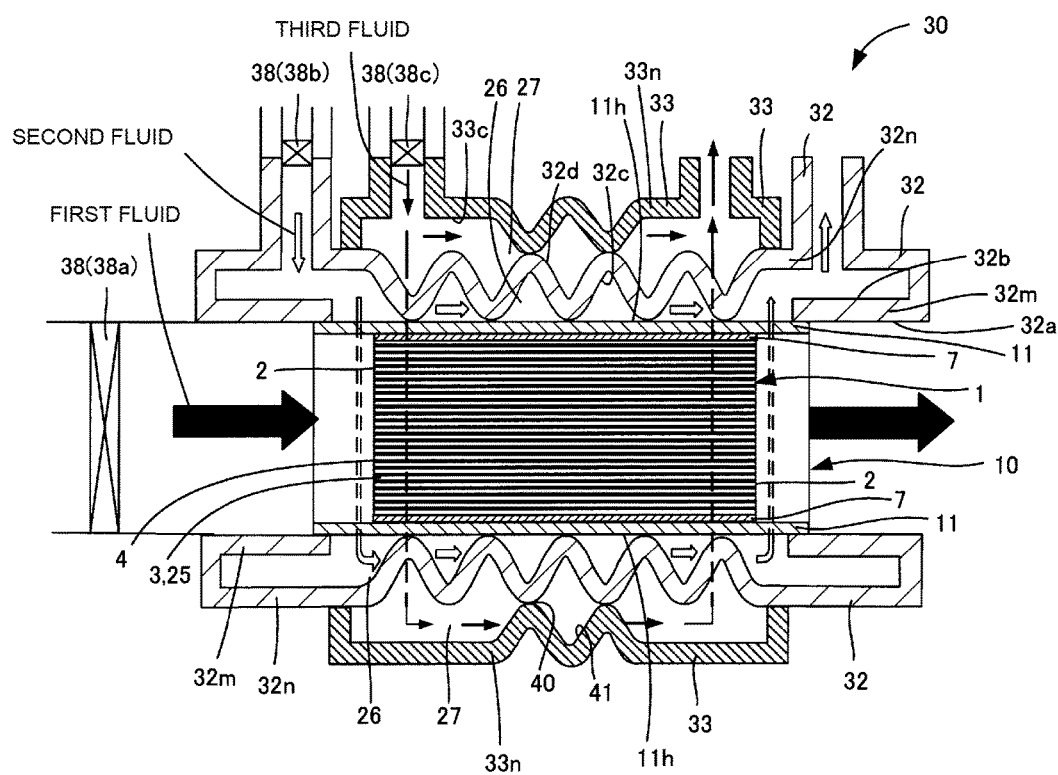
FIG. 9 shows a cross-sectional view of a cross section of a heat exchanger of Embodiment 7 of the present invention parallel to the axis direction.

FIG. 9 is a cross-sectional view of a cross section of the honeycomb structure 1 parallel to the axis direction. In Embodiment 7, a part of the outer circumferential wall 32*n* of the inner casing 32 is in contact with the outer circumferential surface 11*h* of the covering member 11, which is the opposed surface on the inner peripheral side. The outer circumferential wall 33*n* of the outer casing 33 is partially in contact with the outer circumferential surface 32d, which is the opposed surface on the inner peripheral side, of the outer circumferential wall 32n of the inner casing 32. Embodiment 7 also can obtain the effect similar to the above-described effect.

Embodiment 8

Figure 10:
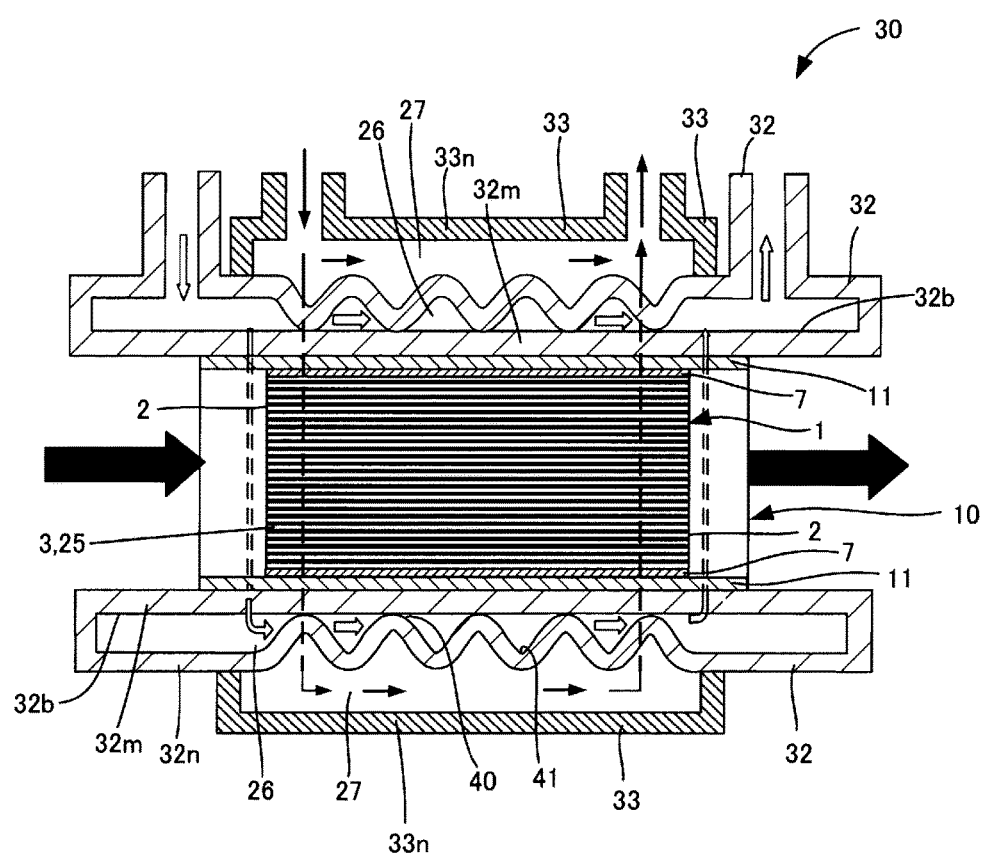
FIG. 10 shows a cross-sectional view of a cross section of a heat exchanger of Embodiment 8 of the present invention parallel to the axis direction.

FIG. 10 is a cross-sectional view of a cross section of the honeycomb structure 1 parallel to the axis direction, and shows an embodiment where a part of the outer circumferential wall 32n of the inner casing 32 is in contact with the outer circumferential surface 32b, which is the opposed surface on the inner peripheral side, of the inner circumferential wall 32m of the inner casing 32.

The embodiment that the heat exchanger 30 includes the flow passages for three fluids is described above; however, the embodiment is not limited to the three fluids, and the embodiment may include a fourth fluid flow through portion, which is a flow passage for the fourth fluid, or the embodiment may include the flow passages of four or more.

EXAMPLES

The following describes the present invention further in detail based on examples; however, the present invention is not limited to these examples.

Example 1

(Production of Honeycomb Structure)

The honeycomb structure 1 of which main component is a Si-impregnated SiC composite material was fabricated as follows. First, a raw material for molding formed by mixing the predetermined amount of SiC powder, binder, water or organic liquid medium, or the like was extruded to the desired shape and dried to obtain the honeycomb formed body. Next, the metal Si was immersed in the honeycomb formed body under depressurized inert gas or vacuum. The honeycomb structure 1 thus fabricated had a dense material where the metal Si filled the gaps between SiC particles, and the honeycomb structure 1 exhibited high thermal conductivity, of approximately 150 W/(m·K). The shape of the honeycomb structure 1 was diameter of 40 mm, length of 100 mm, and at the cell structure part, the thickness of the partition wall 4 was approximately 0.4 mm and the cell pitch was approximately 1.8 mm.

(Fabrication of Fluid Flow Passages)

The metal tube made of stainless steel (covering member 11) was fitted to the outer circumferential surface 7h of the honeycomb structure 1 by shrink fitting to produce the heat exchange member 10 (see FIG. 2A and FIG. 2B), and the heat exchange member 10 was disposed in a casing A (inner casing 32) made of stainless steel. Afterwards, a casing B (outer casing 33) covered the outside of the casing A to fabricate the fluid flow passages constituted of three flow passages (see FIG. 1A).

(Heat Exchange Efficiency Test)

The first fluid was allowed to flow into the cells 3 of the honeycomb structure 1 of the heat exchange member 10, the second fluid was allowed to flow in between the casing A and the heat exchange member 10, and the third fluid in between the casing B and the casing A to measure the heat exchange efficiency. Atmospheric gas was used as the first fluid which was allowed to flow in the cells 3 at a temperature of 400° C. and at a flow rate of 10 g/sec (0.464 Nm³/min). Oil was used as the second fluid which was allowed to flow in a direction opposed to the first fluid and at 60° C. and a flow rate of 10 L/min. Water was used as the third fluid which was allowed to flow at 30° C. and a flow rate of 0 to 10 L/min.

The temperature of the first fluid flowing of 20 mm upstream from the inlet of the cells 3 of the heat exchange member 10 was regarded as "inlet gas temperature" and the temperature of the first fluid flowing of 200 mm downstream from the outlet of the cells 3 was regarded as "outlet gas temperature." The temperature of the oil flowing through the inlet between the casing A and the heat exchange member 10 was regarded as an "inlet oil temperature" and the temperature of oil flowing through the outlet between the casing A and the heat exchange member 10 was regarded as "outlet oil temperature." The temperature of water flow through the inlet between the casing A and the casing B was regarded as "inlet water temperature", and the temperature of water flowing through the outlet between the casing A and the casing B was regarded as "outlet water temperature."

From these temperatures, the heat exchange efficiency (%) between the gas and the oil was calculated by the following expression.

Heat exchange efficiency (%)=(inlet gas temperature−outlet gas temperature)/(inlet gas temperature−inlet oil temperature)×100

The results of the heat exchange efficiency test of the gas (first fluid) and the oil (second fluid) when the water (third fluid) was not allowed to flow are shown in Table 1. The change in the oil temperature when the water (third fluid) is shown in Table 2.

Example 2

(Production of Honeycomb Structure)

The honeycomb structure 1 identical to Example 1 was fabricated.

(Fabrication of Fluid Flow Passage)

Similarly to Example 1, the heat exchange member 10 was manufactured (see FIG. 2A and FIG. 2B) from the stainless steel metal tube (covering member 11) and the honeycomb structure 1 and the heat exchange member 10 was disposed in casing A made of stainless steel. Afterwards, the casing B covered the outside of the casing A to fabricate the fluid flow passages constituted of the three flow passages (see FIG. 1A).

In Example 2, the groove machining (see FIG. 3A) was performed on the outer periphery side (outer circumferential surface 11h) of the metal tube made of stainless steel (covering member 11) of the heat exchange member 10, the outer circumferential surface 32b of the inner circumferential wall 32m of the casing A (inner casing 32), and the inner circumferential surface 32c of the outer circumferential wall 32n (spot facing at 2-mm pitches and 1-mm width×0.5-mm depth) to increase the contacted area with a high viscous fluid (oil) flowing the inside.

(Heat Exchange Efficiency Test)

Similarly to Example 1, the heat exchange efficiency test was conducted. The results of the heat exchange efficiency test of gas (first fluid) and oil (second fluid) when water (third fluid) was not allowed to flow are shown in Table 1. The changes in the oil temperature when the water (third fluid) was allowed to flow are shown in Table 2.

Comparative Example 1

(Production of Honeycomb Structure)

The honeycomb structure 1 identical to Example 1 was fabricated.

(Fabrication of Fluid Flow Passage)

Figure 11:
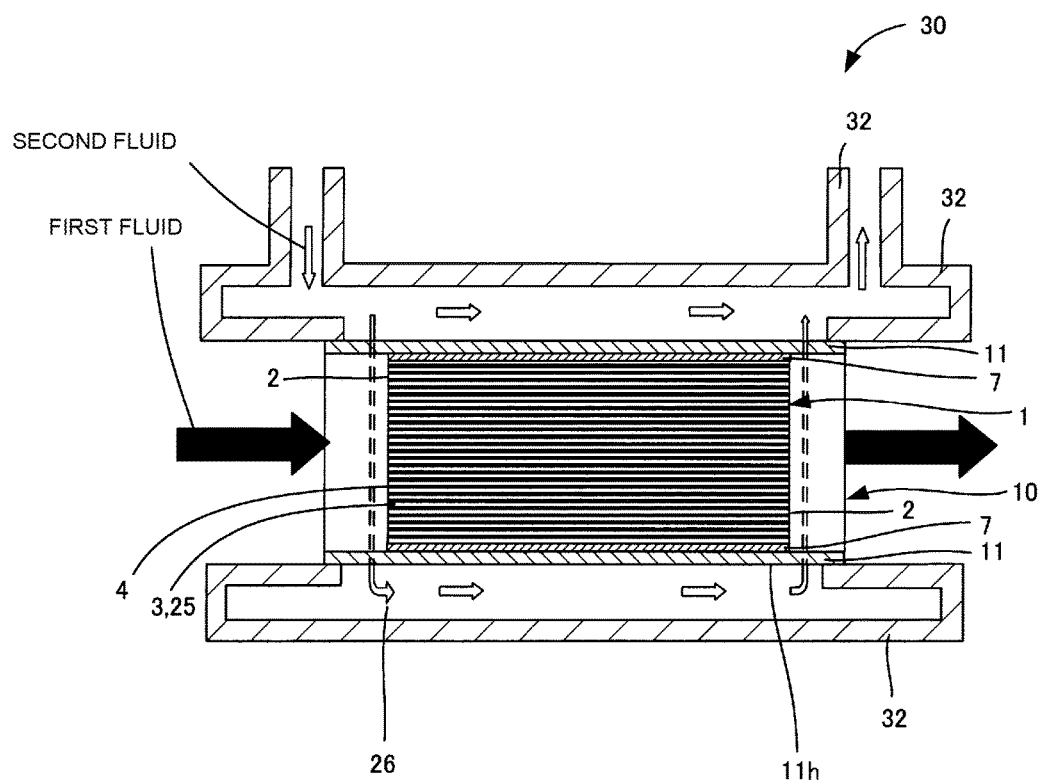
FIG. 11 is a cross-sectional view showing a heat exchanger of Comparative Example 1.

The metal tube made of stainless steel was fitted to the outer circumferential surface of the honeycomb structure 1 by shrink fitting to produce the heat exchange member 10, and the heat exchange member 10 was disposed in the casing A made of stainless steel. Comparative Example 1, different from Examples 1 and 2, is the heat exchanger 30 without the casing B (see FIG. 11).

(Heat Exchange Efficiency Test)

The first fluid was allowed to pass through the cells 3 of the honeycomb structure 1 of the heat exchange member 10, the second fluid was allowed to flow in between the casing A and the heat exchange member 10 and the efficiency of heat transfer was measured. Atmospheric gas was used as the first fluid which was allowed to flow in the cells 3 at a temperature of 400° C. and at a flow rate of 10 g/sec (0.464 Nm$^3$/min). Oil was used as the second fluid which was allowed to flow in a direction parallel to the first fluid and at 60° C. and a flow rate of 10 L/min. The results of the heat exchange efficiency test of the gas (first fluid) and the oil (second fluid) when the water (third fluid) was not allowed to flow are shown in Table 1.

TABLE 1

|  | Water flow rate [L/min] | Heat exchange efficiency between gas and oil [%] | Oil temperature [° C.] |
| --- | --- | --- | --- |
| Example 1 | 0 | 29.4 | 63.8 |
| Example 2 | 0 | 40.1 | 66.0 |
| Comparative example1 | 0 | 29.4 | 63.8 |

TABLE 2

|  | Water flow rate [L/min] | Oil temperature [° C.] |
| --- | --- | --- |
| Example 1 | 0 | 63.8 |
|  | 10 | 62.6 |
| Example 2 | 0 | 66.0 |
|  | 10 | 63.1 |

Example 1 exhibited a heat exchange efficiency between the gas and the oil of a level identical to Comparative Example 1; however, controlling the water flow rate was able to perform temperature control of the oil temperature, which was not controllable in Comparative Example 1. On the other hand, no malfunction of seizure of oil to the inner wall of the pipe and the like was observed.

In Example 2, the heat exchange between the gas and the oil was efficiently performed, and the oil temperature was able to be warmed up efficiently. Controlling the water flow rate allowed the temperature control of oil in a wide temperature range. On the other hand, no malfunction of seizure of oil to the inner wall of the pipe and the like was observed.

On the other hand, in Comparative Example 1, the heat exchange efficiency between the gas and the oil was low compared with Example 2, similarly to Example 1. The temperature of the warmed oil was not able to be controlled. On the other hand, in Comparative Example 1 where the fluids were allowed to flow in parallel, since oil viscosity is in a high state at the inlet side where the gas temperature is high, a malfunction of seizure of oil to the inner wall of the pipe was observed.

(Hot Vibration Test)

In Example 3, using the honeycomb structure 1 identical to Example 1, the fluid flow passage was formed such that a part of the outer circumferential wall 32n of the inner casing 32 was not in contact with the outer circumferential surface 11h, which is the opposed surface on the inner peripheral side, of the covering member 11 (see FIG. 1A and FIG. 1B). In Example 4, using the honeycomb structure 1 identical to Example 1, the fluid flow passage was formed such that a part of the outer circumferential wall 32n of the inner casing 32 was in contact with the outer circumferential surface 11h, which is the opposed surface on the inner peripheral side, of the covering member 11 (see FIG. 7A and FIG. 7B).

A gas of a predetermined temperature and a flow rate at 100 g/s was allowed to flow through the first fluid flow through portion 25, no fluid was allowed to flow to the second fluid flow through portion 26, and the water at 40° C. and of 10 L/min was passed through the third fluid flow through portion 27. Additionally, a vibration was applied to the entire casing at the acceleration of 20 G and a count of vibrations at 200 Hz, thus conducting a durability test at a cycle count of 10$^7$ times. After the test, presence or absence of defect in the samples was confirmed.

TABLE 3

|  | Gas temperature | | |
| --- | --- | --- | --- |
|  | 900° C. | 950° C. | 1000° C. |
| Example 3 | No defect | Honeycomb structure cracked | Honeycomb structure dropped |
| Example 4 | No defect | No defect | No defect |

In Example 3, although defect was not observed under the 900° C. condition, which is the most severe condition for usage environment usually assumed for automobiles and the like, a crack caused by looseness of restrain to the honeycomb structure and vibration occurred at 950° C., and under a 1000° C. condition, the honeycomb structure has dropped. On the other hand, Example 4 where a part of the outer circumferential wall is in contact with the opposed surface at the inner peripheral side, defect was not observed even under the 1000° C. condition. Accordingly, although even Example 3 is applicable under the most serve conditions for usage environment usually assumed for automobiles and the like, durability has been further improved in Example 4.

INDUSTRIAL APPLICABILITY

The heat exchanger of the present invention can be used for an application of heat exchange between a heated body (high temperature side) and a to-be-heated body (low temperature side). To use for an application to recover waste heat from exhaust gas in the field of automobiles, the present invention can be useful to improve the fuel consumption of the automobiles.

DESCRIPTION OF REFERENCE NUMERALS

1: honeycomb structure; 2: end face (in an axial direction); 3: cell; 4: partition wall; 7: circumferential wall; 7h: outer circumferential surface (of the honeycomb structure); 10: heat exchange member; 11: covering member; 11h: outer circumferential surface (of the covering member); 25: first fluid flow through portion; 26: second fluid flow through portion; 27: third fluid flow through portion; 30: heat exchanger; 32: inner casing (casing A); 32*a*: inner circumferential surface (of the inner circumferential surface of the inner casing); 32*b*: outer circumferential surface (of the inner circumferential surface of the inner casing); 32*c*: inner circumferential surface (of the outer circumferential wall of the inner casing); 32*d*: outer circumferential surface (of the outer circumferential wall of the inner casing); 32*m*: inner circumferential wall (of the inner casing); 32*n*: outer circumferential wall (of the inner casing); 33: outer casing (casing B); 33*c*: inner circumferential surface (of the outer circumferential wall of the outer casing); 33*n*: outer circumferential wall (of the outer casing); 34: concave portion or convex portion; 38: flow rate control means; 38*a*: flow rate control means (of the first fluid); 38*b*: flow rate control means (of the second fluid); 38*c*: flow rate control means (of the third fluid); 40: contact portion; 41: non-contact portion.

The invention claimed is:

1. A heat exchanger comprising:
    a honeycomb structure of which main component is ceramics having a tubular circumferential wall and a partition wall defining and forming a plurality of cells serving as a flow passage for a first fluid;
    a covering member located on an outer periphery side of the honeycomb structure to cover the honeycomb structure;
    an inner casing that defines a second fluid flow through portion located at an outer periphery side of the covering member and serving as a flow passage for a second fluid; and
    a third fluid flow through portion located at an outer periphery side of the second fluid flow through portion and serving as a flow passage for a third fluid,
    wherein heat is exchanged among the first fluid, the second fluid, and the third fluid without being mixed with one another, and wherein the first fluid, the second fluid and the third fluid are different,
    wherein the inner casing includes an opening that allows direct contact between the second fluid and the covering member, and
    wherein the inner casing extends axially outward from the end of the covering member in the axial direction.

2. The heat exchanger according to claim 1, wherein a concave portion or a convex portion is provided on at least any of the wall surfaces of the second fluid flow through portion and the third fluid flow through portion to increase a surface area of the wall surface.

3. The heat exchanger according to claim 1, wherein a part of at least one of the outer circumferential wall of the inner casing constituting the second fluid flow through portion and the outer circumferential wall of the outer casing constituting the third fluid flow through portion is in contact with an opposed surface on an inner peripheral side to form a contact portion.

4. The heat exchanger according to claim 3, wherein the contact portion is formed at at least either of the second fluid flow through portion and the third fluid flow through portion, while a non-contact portion with the opposed surface on the inner peripheral side is also present at the outer circumferential wall forming the contact portion in any cross section perpendicular to an axial direction of the honeycomb structure in a range of the axial direction where the contact portion is formed, so that the presence of the non-contact portion allows the second fluid to flow through the second fluid flow through portion without interference and further allows the third fluid to flow through the third fluid flow through portion without interference.

5. The heat exchanger according to claim 1, further comprising
    flow rate control means configured to control a flow rate of the fluid at least at the flow passage for any of the fluids of the first fluid, the second fluid, and the third fluid.

* * * * *